United States Patent [19]

Hunt

[11] Patent Number: 4,723,814
[45] Date of Patent: Feb. 9, 1988

[54] VEHICLE PROTECTION DEVICE

[76] Inventor: Evelyn E. Hunt, Badgers' Bank, 12 Fieldside, Long Wittenham, Oxon, United Kingdom, OX14 4QB

[21] Appl. No.: 1,020

[22] Filed: Jan. 7, 1987

[51] Int. Cl.$^4$ .............................................. A47C 31/10
[52] U.S. Cl. ..................................... 297/219; 297/229
[58] Field of Search ................ 297/219, 220, 229, 184

[56] References Cited

U.S. PATENT DOCUMENTS

| | | | |
|---|---|---|---|
| 827,417 | 7/1906 | Calbeck et al. | 297/184 X |
| 1,051,566 | 1/1913 | Dreher | 297/229 X |
| 1,486,296 | 3/1924 | Olsen | 297/219 |
| 1,962,215 | 6/1934 | Sallop | 297/219 |
| 1,975,599 | 10/1934 | Fry | 297/219 |
| 2,497,698 | 2/1950 | Struble et al. | 297/220 |
| 2,511,452 | 6/1950 | Anderson et al. | 297/184 |
| 4,643,479 | 2/1987 | Servi | 297/184 |

Primary Examiner—Francis K. Zugel
Attorney, Agent, or Firm—Holman & Stern

[57] ABSTRACT

A vehicle seat protection device, for protecting a seat having a back, consists of a loose seat cover attached to an elongate member. The elongate member has fixing means for fixing the member in proximity to the upper edge of the seat back. The elongate member also has means for detachably connecting the seat cover thereto.

5 Claims, 7 Drawing Figures

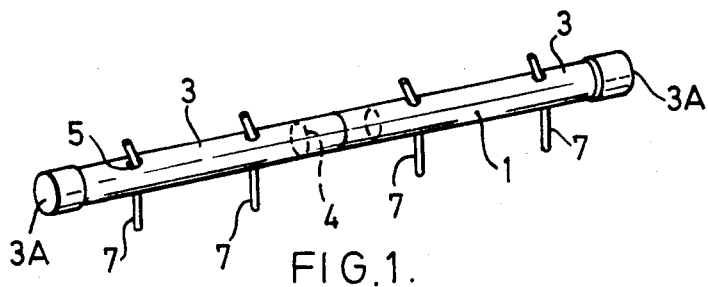
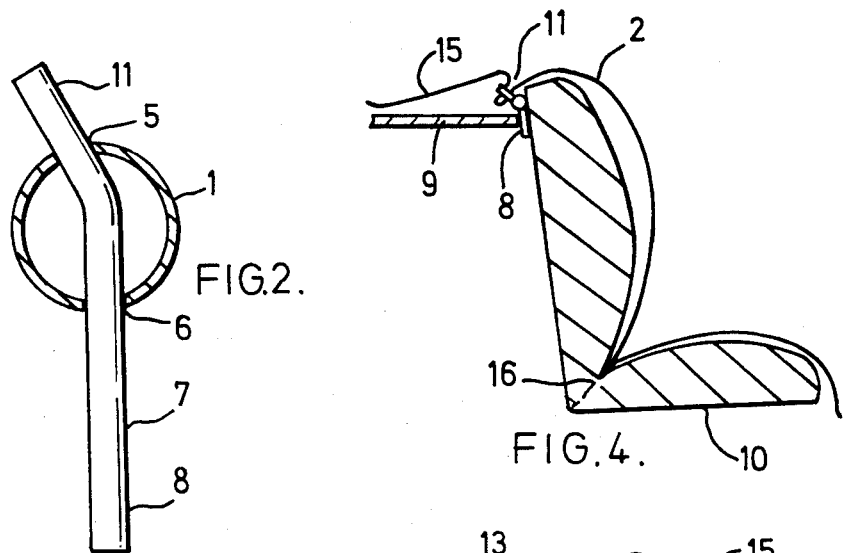
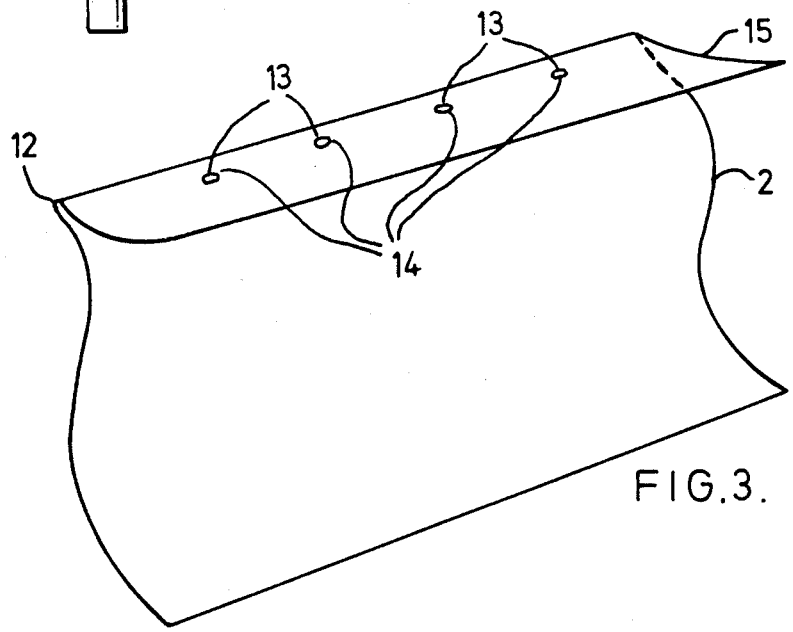

VEHICLE PROTECTION DEVICE

BACKGROUND TO THE INVENTION

The present invention relates to a vehicle protection device, and in particular to a device for protecting a car seat from soilage from children or domestic pets such as dogs.

When children or domestic pets travel on the seat of a car there is a constant risk of soiling or damage to the seat upholstery. This can be avoided by laying a blanket or some other protective sheet over the seat, but such an arrangement is not satisfactory since the blanket or sheet can easily be dislodged in use.

SUMMARY OF THE INVENTION

A solution to the problem has now been found whereby a protective sheet is anchored to a support which is fixed so that the said protective sheet covers the seat with reduced risk of movement during use.

According to the present invention there is provided a vehicle seat protection device, comprising a loose seat cover attachable to an elongate member, for use with a vehicle seat with a horizontal seat portion and a back. The said elongate member may be fixed in proximity to the upper edge of said seat back. Fixing means are provided on the elongate member and said elongate member also comprises means for detachably connecting the seat cover thereto.

DESCRIPTION OF PREFERRED EMBODIMENTS

Preferably, the elongate member comprises a tubular bar of metal or plastics material which extends almost the complete width of the seat. Conveniently, the bar may comprise two shorter bars connected by means of an external sleeve or an internal joint. One of the shorter bars may then be used alone if it is desired to protect only one half of the rear seat or a single front seat.

The fixing means preferably comprise at least two projecting portions spaced along the length of the said elongate member.

In a particularly preferred embodiment of the present invention, in which the device is used to protect the rear seat of a saloon car or estate car with a parcel shelf, the said projecting portions are downwardly extending pins. The said pins are inserted as a tight push fit into the gap between the said parcel shelf and the said seat back. This enables the elongate member to be anchored firmly without the risk of movement during use. When the elongate member comprises two connected bars, then each bar may have at least two of the said downwardly extending pins to function in the desired manner.

In a further particularly preferred embodiment, in which the device is used to protect the rear seat of a saloon car or estate care with a rolled over seat back extending rearwardly over a shelf or other surface, the said projecting portions are horizontally extending pins.

In a further embodiment of the present invention the fixing means include at least one and preferably two substantially U shaped projections, and said projections may be used to hang the elongate member from the seat back.

The seat cover may consist of an approximately rectangular sheet of abrasion-resistant fabric, suitably cloth-backed plastics material, which is shaped to cover the back and seat portions of a car seat.

The means for detachably connecting the seat cover to the elongate member preferably comprises two or more angled projecting pins on the elongate member, usually inclined away from the vertical. The seat cover is then formed with a line of a similar number of retaining holes which can hook over the said angled projecting pins, so as to prevent the cover slipping off when in use.

In a particularly preferred embodiment of the invention, the said retaining holes are formed in a fold in the seat cover so that if used to protect the rear seat of a car with a parcel shelf, a part of the cover on one side of the line of holes can protect the parcel shelf while the part of the cover on the other side of the line of holes can protect the car seat. The fold may be kept permanent by use of metal or plastic eyelets affixed to the holes.

Suitably, each said angled projecting pin is integrally formed with a projecting portion of the fixing means, the whole pin being inserted with a friction fit into holes formed in the elongate means.

The invention is now described by way of non-limiting examples with reference to the accompanying drawings, in which:

FIG. 1 is a perspective view of a tubular bar for fitting to the rear parcel shelf of a car;

FIG. 2 is a vertical section through the tubular bar of FIG. 1, showing a projecting pin;

FIG. 3 is a perspective view of a rear seat cover;

FIG. 4 is a vertical section through a rear car seat and parcel shelf showing the seat cover and tubular bar in position;

EXAMPLE 1

Figure 5:
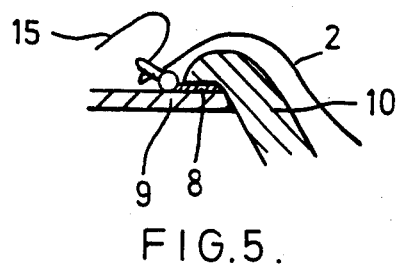
FIG. 5 is a vertical section similar to FIG. 4 but taken through a rolled over seat back.

Referring to FIGS. 1 to 4, an embodiment of the present invention is described in which the seat cover is used to protect the rear seats of a car with a parcel shelf.

The car seat protection device of the invention comprises a tubular bar 1 and a loose cover 2 of strong, cloth backed plastics material.

The tubular bar 1 consists of two halves 3 of hollow, cylindrical plastics or metal material joined together by means of a tight fitting cylindrical insert 4. Each half bar 3 is drilled to provide holes 5 and 6 through which is inserted a metal pin 7 to form a tight friction fit therein. The overall length of the metal pin is about 10 cms and its thickness is about 6 mm. Each half bar 3 has two pins 7 spaced apart by about 25 cms, the overall length of each bar 3 being about 50 cms. The two half bars 3 also have end protective caps 3A of plastics or rubber material.

As can be seen from FIGS. 2 and 4, each pin 7 is angled so that the lower portion 8 thereof can be inserted as a tight fit into the gap between a parcel shelf 9 and a rear seat 10 while the upper portion 11 extends rearwardly towards the back of the parcel shelf. When the lower portions 8 of all the pins are inserted into the aforementioned gap, the bar 1 is held rigidly in a position behind the top of the back seat, as shown in FIG. 4.

The loose cover 2 has a fold at 12 and four holes 13 with eyelets 14 of metal or plastics material are formed therein to maintain permanently the fold 12. The spacing between the holes 13 matches that between the pins 7 on the bar.

In use, the tubular bar 1 is firmly anchored behind the rear seat by pushing the lower portion 8 of each pin 7 into the gap between the parcel shelf 9 and the rear seat 10. The loose cover is then attached to the bar 1 by inserting the upper portion 11 of each pin 7 through a corresponding hole 13 in the cover. The upper flap 15 of the cover 2 may be folded back to cover the parcel shelf 9 while the rest of the cover 2 is layed over the car seat 10 and can be tucked in at the rear 16 of the seat 10.

The rearward inclination of each upper pin portion 11 prevents the cover 2 from becoming detached, and the cover 2 thus conceals not only the parcel shelf 9 and the car seat 10, but also the projecting pin portions 11.

If desired, only one-half of the rear seat 10 may be protected by removing one of the half bars 3, and using the remaining bar 3.

EXAMPLE 2

Referring to FIG. 5, a second embodiment is for use with cars have rolled over seat backs. In this instance the pins 7 are inserted horizontally in to the gap between the shelf 9 and seat 10.

EXAMPLE 3

Figure 6:
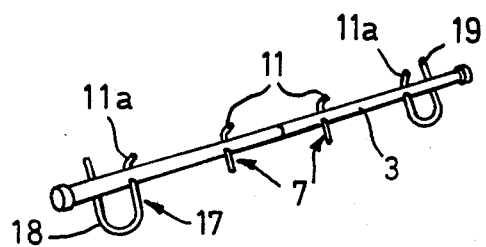
FIG. 6 is a perspective view of a tubular bar for fitting in the rear seat of a car without a parcel shelf or the front seats of a car.
Figure 7:
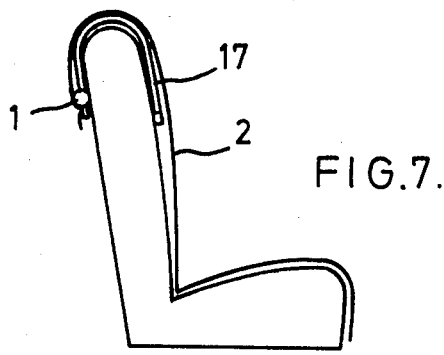
FIG. 7 is a vertical section through a front car seat showing the seat cover, fixing bar and seat hanger conversion pin in position.

Referring to FIGS. 6 and 7, a third embodiment of the present invention is described in which a seat cover of the present invention is used to protect a seat which does not have a parcel shelf behind it or a similar groove created by any other means.

FIG. 6 shows the same tubular bar as shown in FIG. 1 and described in Example 1 except that the standard metal pins 7 at each end of the bar 1 have been replaced by metal, generally U-shaped, right- and left-hand seat hanger conversion pins 17. The seat hanger conversion pins 17 comprise a U shape with sides of unequal length, the end of each side having a protective cap 19. The end section of the shorter side is bent out of the plane of the rest of the pin. The long side has an overall length of abaout 18 cm and the short side an overall length of about 12 cm. The two sides are separated by a curved section. The gap between the two sides is about 8 cm. A seat hanger conversion pin 17 is inserted through each hole 5,6 closest to the ends of the tubular bar 1. Each seat hanger conversion pin 17 is arranged such that an angled portion 11a extends from one side of the tubular bar 1 and a substantially U-shaped portion 18 extends from the other side of the tubular bar 1. As can be seen in FIG. 7 the loose cover 2 is attached to the angled portions 11, 11a and the tubular bar 1 is hung on the seat back by means of the U-shaped portions 18 of the seat hanger pins 17.

During assembly two standard pins 7 are inserted through the middle two holes in the tubular bar 1 as described in example 1. After removing the protective cap 19 from the end of the long side of a first seat hanger conversion pin 17, the long side is inserted into the appropriate end hole in the tubular bar 1, as shown in FIG. 6. The curved part of the seat hanger conversion pin 17 is passed through the hole 5,6 in the bar 1 until the angled end 11a is in line with the angled ends 11 of the standard pins 7. Protective tubing may be placed over the U-shaped portion 18 and the protective cap 19 replaced. Similarly a second seat hanger conversion pin 17 inserted through the other end hole of the tubular bar 1, as shown in FIG. 5. The seat cover 2 is fitted to the tubular bar outside the car and then the whole unit is put into place. To attach the seat cover 2 to the tubular bar 1 the seat hanger conversion pins 17 are positioned such that the angled pin ends 11a are at right angles to the tubular bar 1 and in line with the angled portions 11 of the standard pins 7. The eyelets 14 of cover 2 are placed over the pin ends 11, 11a with the main part of the cover on the same side of the tubular bar 1 as the U-shaped portions 18 of the seat hanger conversion pins 17. The two U-shaped portions 18 of the seat hanger conversion pins 17 are then rotated so as to be at right angles to the tubular bar 1. This has the effect of rotating outwards the angled ends 11a of the seat hanger conversion pins 17, thereby locking the seat cover 2 onto the tubular bar 1. The tubular bar 1 and cover 2 are hung on the seat back using the seat hanger pins 17 as shown in FIG. 7.

For use on both front seats one seat hanger pin 17 is hung on each seat. To cover one front seat only both seat hanger pins 17 are fitted to one half bar 3.

The embodiments of the invention in which an exclusive property or privilege is claimed are defined as follows:

1. A protection device for a seat having a back, said device comprising a loose seat cover and securing means attachable to said cover for locating a portion of said cover in proximity to the upper edge of said seat back, without previous adaptation of said seat to receive said device, said securing means comprising at least two locking pins, each having first and second ends, and an elongate member comprising a tubular element of metal or plastics material extending along a substantial part of the width of the seat, said pins being located through said elongate member with both the first and second ends projecting from said member for securing said member in proximity to the upper edge of said seat back and for securing the cover to said member respectively wherein said seat cover is formed with a line of at least two retaining holes, said cover being attachable to said elongate member by means of said second ends of said pins projecting into said holes, said second ends being angled away from said first ends and projecting from the opposite side of said elongate member from said first ends, such that counter-rotation of said pins within said elongate member after location of said cover over said second ends prevents detachment of said cover from said member by realigning said second ends of said pins with regard to said holes.

2. A device according to claim 1 wherein said elongate member comprises two bars connected by means of an external sleeve or internal joint.

3. A device according to claim 1 wherein said first ends of at least two of said pins extend downwardly or horizontally so as to be insertable as a tight push fit into a gap between said seat back and a parcel shelf.

4. A device according to claim 1 wherein said first ends of at least two of said pins are substantially U-shaped projections capable of hooking over said seat back so as to hang said elongate member therefrom, said cover being placed over said second end of said pins prior to location on said seat, said counter-rotation being required before said location, thereby locking said cover on said elongate member.

5. A device according to claim 1 having at least four of said pins, wherein said first ends of at least two of said pins are substantially U-shaped projections capable of hooking over said seat back so as to hang said elongate member therefrom, and said first ends of at least another two of said pins extend downwardly or horizontally to brace said elongate member against said seat back, said cover being placed over said second ends of said pins prior to location on said seat, said counter-rotation of said U-shaped ends being required before said location, said cover being thereby locked on said elongate member.

* * * * *